INVENTORS
Howard W. Christenson &
Robert H. Schaefer
BY A. M. Heiter
ATTORNEY

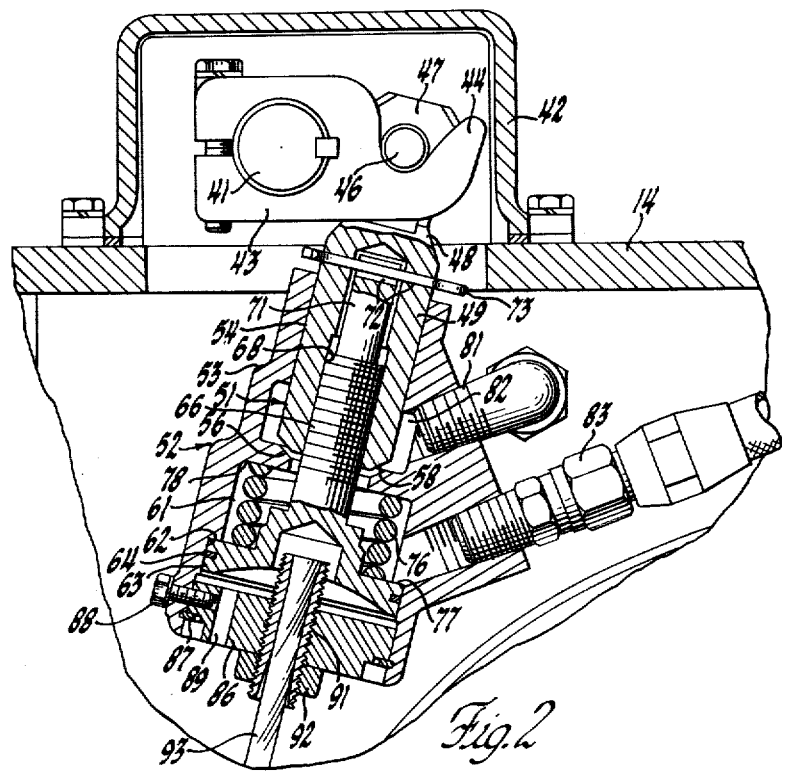
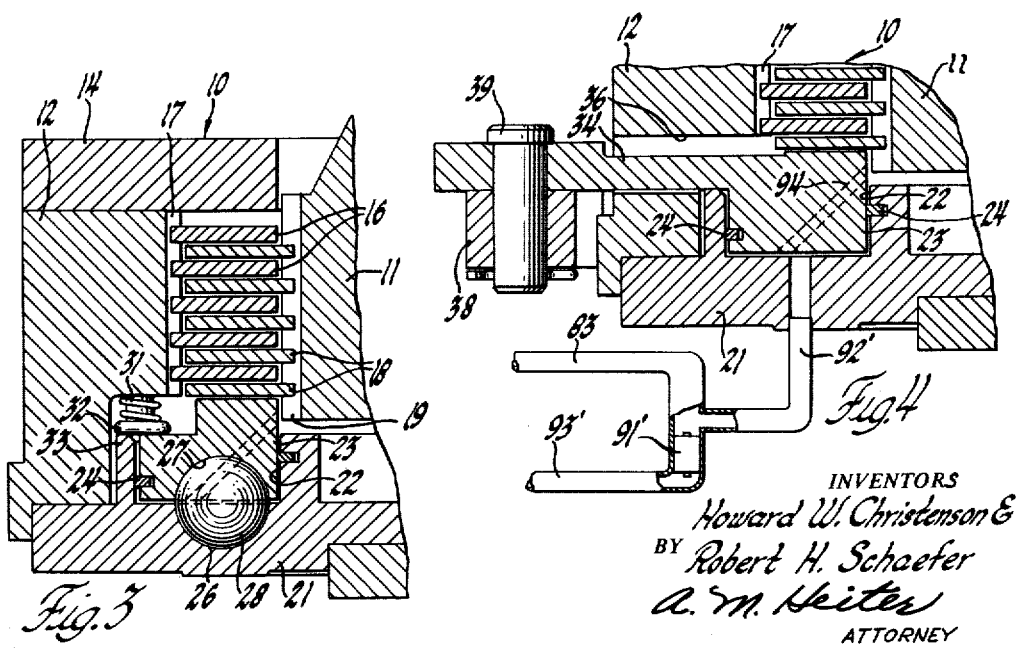

3,106,268
BRAKE

Howard W. Christenson, Indianapolis, and Robert H. Schaefer, Westfield, Ind., assignors to General Motors Corporation, Detroit, Mich., a corporation of Delaware Filed June 6, 1960, Ser. No. 34,122
18 Claims. (Cl. 188—152)

This invention relates to a brake and more particularly to a hydro-mechanical brake having a mechanical control providing both mechanical and hydraulic and self-energized braking forces.

In order to obtain the necessary high brake applying forces and high torque absorption required in many heavy duty brakes it is necessary to multiply the brake applying forces. In the present invention the multiple disc brake provides a compact brake providing a high surface area. The brake plates are immediately applied by a hydraulic piston to provide a power operated brake actuated by a source of fluid under pressure. In addition, the piston contacts the rotating brake plate so that it is rotated during brake operation to cause a plurality of cam devices to function to provide additional self-energizing braking forces which increase proportionally with the increase in brake application. The brake also is mechanically applied by mechanically rotating the piston which, through the operation of the cam mechanism, axially moves the piston into engagement with the brake plate to engage the brake. The mechanical linkage employed to rotate the piston has a control valve mechanism to provide a hydraulic pressure proportional to the mechanical brake apply force. This fluid pressure is transmitted to the hydraulic brake cylinder to provide an axial force proportional to the hydraulic pressure in the booster and thus proportional to brake pedal pressure. During brake application the manual effort applied to the brake pedal is applied to rotate the brake piston. This manual and hydraulic force tending to rotate the piston is transferred into axial movement by the cam mechanism and acts in conjunction with hydraulic pressure proportional to the mechanical apply force in the brake cylinder which provides an additional braking force. After the brakes are initially engaged the self-energizing force acting to rotate the piston actuates the cams to assist engagement of the brake. Though each of these forces may be multiplied alone to provide increased braking, it has been found that the multiplication of all of these forces provides an improved brake control more fully responsive to the movement of the operating pedal by the operator and more consistently responsive so that infinite brake multiplication and thus brake locking is avoided.

An object of the invention is to provide in a hydro-mechanical brake a hydraulic brake booster providing a direct assisting force to apply the brake and a mechanical brake linkage proportionably controlling the supply of fluid to the hydraulic brake booster and a mechanical brake applying force.

Another object of the invention is to provide in a hydraulically and mechanically applied brake, a control valve actuated by the brake control linkage to supply a pressure proportional to the force applied to the mechanical brake linkage to the hydraulic apply mechanism of the brake to assist the mechanical brake apply mechanism.

Another object of the invention is to provide in a hydraulically and mechanically applied friction engaging device a hydraulic assist force proportional to the manual applied braking force.

Another object of the invention is to provide in a friction engaging device movable in one direction to apply said device and movable in another direction to actuate the self-energizing mechanism, a hydraulic actuating mechanism to directly move said device in the apply direction and mechanical actuation means to move said device directly in the self-energizing direction to actuate mechanical means to move the device in the self-energizing direction to actuate mechanical means to move the device in an apply direction.

Another object of the invention is to provide in a friction engaging device movable in an axial direction to engage the device and rotatable to actuate a self-energizing mechanism to axially move the device for engagement, a mechanical control linkage operative to rotate the device and to supply a pressure proportional to the mechanical force to a hydraulic motor operative directly to axially move the device.

Another object of the invention is to provide a simplified mechanical force transmitting and proportional pressure control device.

These and other objects of the invention will be more apparent from the following description of a preferred embodiment of the invention described in the specification and shown in the drawings.

FIGURE 2 shows a partial section of the brake mechanism showing the valve in the open position.

FIGURE 3 is a partial section of the brake on the line 3—3 of FIGURE 1.

FIGURE 4 is a partial section of FIGURE 1 on the line 4—4.

Figure 1:
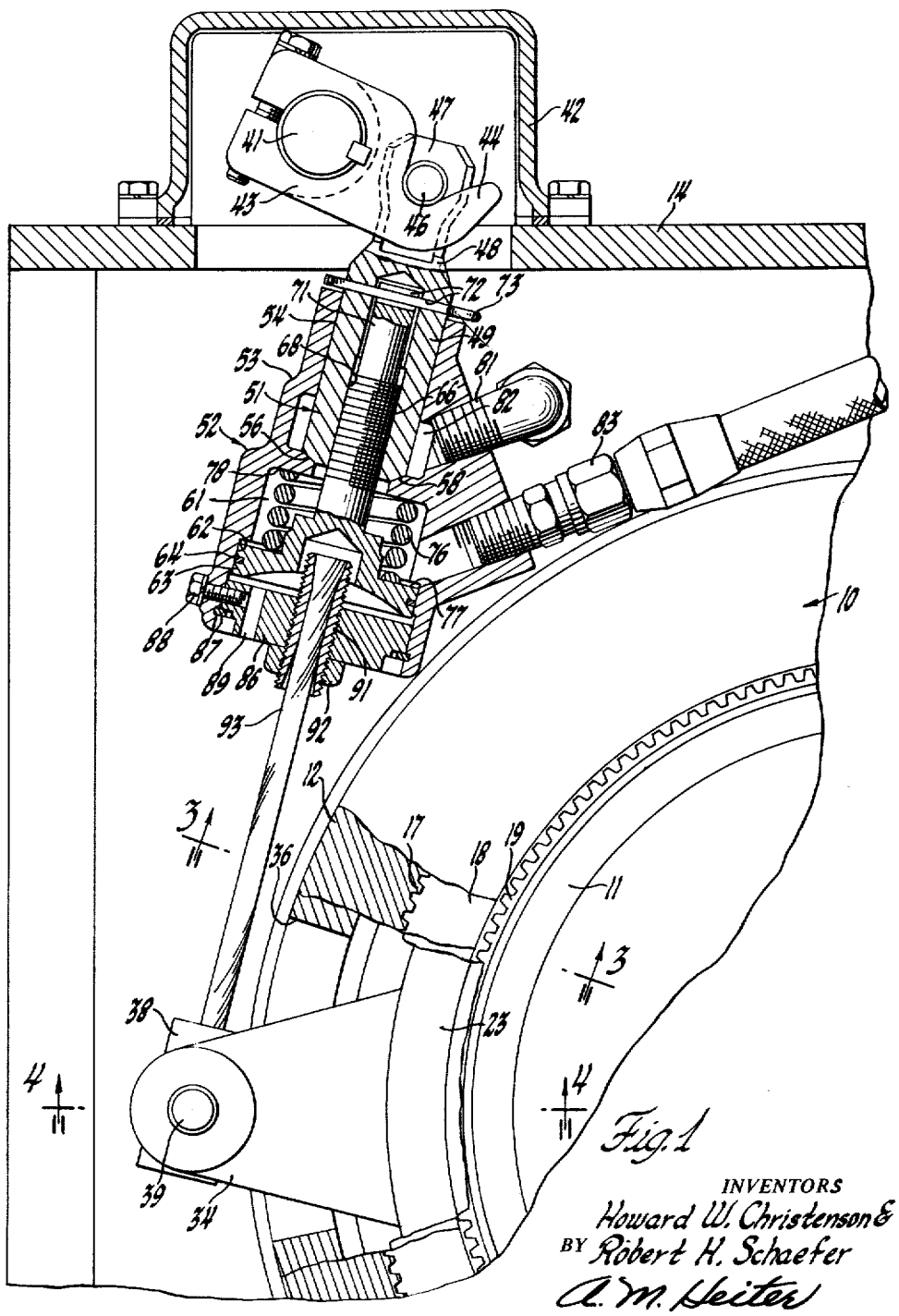
FIGURE 1 shows a partial sectional view of the brake mechanism with parts broken away to show details and with the valve in the closed position.

The hydro-mechanical mechanism for friction engaging devices for transmitting torque in motion or to a stationary housing such as in a clutch or a brake is illustrated by the preferred embodiment illustrating a brake 10.

The brake consists of a rotating drum 11 and a fixed drum 12 formed as a portion of the stationary housing 14. The brake 10 is of the plate type having alternate plates 16 connected by splines 17 to the fixed drum 12 and intermediate plates 18 connected by splines 19 to the rotating drum 11. The fixed housing 14 has a cylinder portion 21 having a cylinder 22 formed therein to receive the annular piston 23. Suitable seals 24 seal the relatively axially slidable and rotatable annular piston and cylinder at the cylindrical piston and cylinder walls. The flat annular wall of the cylinder has ramps 26 and the similar facing wall of the piston has cam ramps 27 to receive the cam balls 28 so that on relative rotary movement of the piston 23 with respect to the cylinder member 21 in either direction the piston is moved axially away from the cylinder member to engage the brake plates. The brake retraction spring 31 is seated in a bore in the housing 12 and acts against the plunger 32 to return the piston 23 to the disengaged position shown in FIGURE 3 as limited by the stop shoulder 33. The piston 23 is mechanically rotated by the integral ear 34 which extends through the circumferential slot 36 in the drum 12 of housing 14. The clevis 38 is secured to the ear 34 by a pin or rivet 39.

The brake pedal or brake applying lever (not shown) on brake application movement rotates the shaft 41 counterclockwise. The shaft 41 is rotatably mounted in the housing portion 42 secured to the housing 14 and has an arm 43 fixed thereto. The end of the arm 43 has a hook portion 44 engaging the pin 46 which extends between the tangs 47 of the forked end 48 of the valve portion 49 of the valve and piston assembly 51 of the booster 52.

The booster 52 has a housing 53 having a bore 54 terminating in a seat 56 which received the valve element 49. The valve element has a valve seat 58 cooperating with the seat 56 on the body 53. The booster body 53 also has an enlarged bore or spring chamber 61 and a cylinder 62 both coaxial with bore 54. The valve and piston assembly 51 has a piston portion 63 which has a suitable piston ring 64 fitting in cylinder 62 and a stem portion 66 threaded into the bore 68 of the valve member 49 to adjust the relative axial position of the piston 63 and valve seat 58. A terminal portion 71 of stem 66 and the valve member 49 have suitable aligned apertures 72 to receive a cotterpin 73 to lock the valve member 49 and piston member 63 in adjusted position. A heavy coil spring 76 is located between the shoulder 77 on piston 63 and the shoulder 78 on the housing 53 to normally bias the valve and piston element 51 to the closed position shown in FIGURE 1.

A suitable source of fluid under pressure is supplied via line 81 to the port 82. The valve element 49 controls the flow of fluid from port 82 to the spring chamber 61 and piston 63 to supply a fluid pressure to line 83 proportional to the mechanical brake apply force being transmitted from the brake pedal through shaft 41. When the pressure line 83 reaches a predetermined proportional value the pressure acting on piston 63 closes valve 49.

The cylinder 62 of housing 53 is closed at its lower end by a wall 86 secured in place by the snap ring 87 and locked against rotation by bolt 88. The vent 89 prevents accumulated fluid between wall 86 and piston 63 interfering with the operation of the valve. A ferrule 91 is threadably secured in a suitable aperture in the center of wall 86 and locked in place by lock nut 92. The cable 93 is suitably secured to the ferrule 91 by having a flared end matching the tapered inner wall of the ferrule to connect the housing 53 to the clevis 38 and the ear 34 which is attached to the brake piston 23. The line 83 is connected through shuttle valve 91' and line 92' as shown in FIGURE 4 to the cylinder 22. If it is desired to also actuate the brake 10 solely by hydraulic pressure from another control system, the brake apply line 93' of this control system is connected through shuttle valve 91' to line 92'. The shuttle valve will in response to pressure in line 83 or 93' connect the line under pressure to line 92'. The cylinder 22 is continuously drained at a rate slower than the rate of supply by line 94 which supplies cooling fluid to the brake plates.

Though it is believed from the above details of construction that the operation of the brake will be apparent, it is believed desirable to point out the basic operating principles. When the brake lever is initially moved in the brake apply direction to rotate the shaft 41, hook 44 connected through pin 46 to the valve and piston member 51, moves the valve and piston member and through the heavy spring 76 transmits the mechanical brake apply force to the housing 53 which is connected through cable 93 and ear 34 to rotate the piston 23. Rotation of piston 23 through the action of cams 28 causes initial mechanical brake operation. This initial mechanical brake operation on engagement of piston 23 with the rotating brake plate 18 provides mechanical brake actuation with a self-energizing force. The brakes will be mechanically applied in this manner for low braking effort applications to the extent that spring 76 can transmit force without being compressed to open the valve.

In the preferred embodiment the spring is preloaded so that between ¼ and ½ of the maximum brake application force may be mechanically applied to provide direct reaction or feel to the brake apply lever actuated by the operator. However, it will be appreciated that this degree of direct mechanical feel can be reduced or increased by varying the prestressing of the spring. However, if more braking force is desired, the operator applies a higher force to the brake apply lever. Then the spring 76 will be compressed opening valve 49. Fluid under pressure is connected from the source via line 81 through the valve seats 56, 58 to the chamber 61 and cylinder 62 to act on the piston 63 and to flow via lines 83 and 92' to cylinder 22 to act on the piston 23. A restricted or reduced volume of flow is always connected by cooling line 94 to exhaust. Since the valve supplies fluid at a higher flow rate to cylinder 22 than the flow rate of the exhaust 94, the pressure rises in cylinder 22. As the pressure rises in the cylinder 22, the brake is hydraulically engaged. This pressure rise is reflected in the cylinder 62 acting on the piston 63 to tend to close the valve 49 to reduce the rate of flow through the valve to the rate of flow through the exhaust to maintain a pressure in cylinder 22 proportional to the mechanical braking force. A reduction in the mechanical braking force will further close the valve reducing the flow to a rate less than the exhaust flow to reduce the pressure in the cylinder 22. Thus the manually applied braking force is transmitted from valve 49 by the spring and hydraulic force on piston 63 to housing 53 and cable 93 mechanically to the brake. This mechanical force controls a pressure which is proportional to the excess manual force above that predetermined value required to initially compress the spring to provide an additional hydraulic brake actuating force. In this way a large range of brake actuating pressures can be obtained.

It will be appreciated that the hydraulic boost brake apply force only moves the piston axially and is not multiplied by the cam mechanism. Only the low mechanical brake apply forces and the self-energizing brake forces tend to rotate the piston and actuate the cam mechanism to axially move and apply the brake. Thus this boost arrangement does not modify or interfere with the proper operation of this self-energized brake.

The above described embodiment is illustrated in the invention which may be modified within the scope of the appending claims.

We claim:

1. In a control system for a friction engaging device, a first member, a second member, a plurality of friction elements with a first of said elements connected to said first member and a second of said elements connected to said second member, a fluid motor having an operating chamber and a movable wall mounted for one movement to engage said first and second elements and for another movement in another direction and including cam means responsive to said another movement of said movable wall to move said movable wall in said one movement to engage said first and second elements, manual brake apply means connected to said movable wall to directly effect said another movement which will actuate said cam means to move said movable wall in said one movement to engage said first and second elements, a source of fluid under pressure, said manual brake apply ing means including contol valve means controllably connecting said source to said chamber operable to connect said source to said operating chamber to supply fluid to said operating chamber having a pressure varying with the manual force applied to said movable wall by said manual applying means.

2. In a control system for a friction engaging device, a first member, a second member, a plurality of friction elements with a first of said elements connected to said first member and a second of said elements connected to said second member, engaging means including a chamber and movable wall mounted in said chamber for a first movement in one direction to contact said second element to engage said first and second friction elements and including cam means responsive to a second movement in another direction of said wall relative to said chamber to move said wall in said first movement into engagement with said second element to engage said first and second elements, manual applying mechanical linkage means directly connected to said wall to first manually move said wall in said second movement which will then actuate said cam means to then move said wall in said first movement to engage said first and second elements, a source of fluid under pressure, said manual applying means including control valve means controllably connecting said source to said chamber to supply fluid to said chamber having a pressure varying with the mechanical applying force transmitted by said manual applying means.

3. In a control system for a friction engaging device, a first member, a second member, a plurality of friction elements with a first of said elements connected to the first member and a second of said elements connected of said second member, engaging means including a cylinder and a piston mounted in said cylinder for axial movement to engage said second element to engage said elements and for rotary movement and including cam means responsive to rotary movement of said piston relative to said cylinder to move said piston axially into engagement with said second element to engage said first and second elements, manual brake applying means directly connected to said piston to first rotate said piston with a manual force to actuate said cam means to thereafter axially move said piston to engage said first and second elements, a source of fluid under pressure, said maual applying means including control valve means controllably connecting said source to said cylinder operable only above a predetermined brake applying manual force operative to initially apply the brake and then to connect said source to said cylinder to supply fluid to said cylinder having a pressure proportional to the increase of the mechanical applying force above said predetermined brake apply manual force transmitted by said manual applying means.

4. In a control system for a friction engaging device, a first member, a second member, a plurality of friction elements with a first of said elements connected to the first member and a second of said elements connected to said second member, engaging means including a cylinder and a piston mounted in said cylinder for axial movement to contact said second element to engage said first and second elements and for rotary movement and including cam means responsive to rotary movement of said piston relative to said cylinder to move said piston axially into engagement with said second element to engage said first and second elements, said cylinder having exhaust means to continuously exhaust fluid from said cylinder, manual applying means connected to said piston to first apply a force to rotate said piston prior to engagement of said piston with said second element to actuate said cam means to then axially move said piston to engage said first and second elements, a source of fluid under pressure, said manual applying means including control valve means operable to connect said source to said cylinder and to control the rate of supply of fluid to said cylinder to provide a pressure in said cylinder varying with the mechanical applying force transmitted by said manual applying means in said cylinder to provide a brake applying force and cooling flow directly proportional to said applied force.

5. In a control system for a friction engaging device, a first member, a second member, a plurality of plates with a first of said plates connected to the first member and a second of said plates connected to said second member, a cylinder and a piston mounted in said cylinder for axial movement to contact said second plate and engage said first and second brake plates and for rotary movement and including cam means operatively responsive to rotary movement of said piston relative to said cylinder to move said piston axially into contact with said second plate, manual applying means connected to said piston to first rotate said position prior to contact with said second plate to actuate said cam means to then axially move said piston to engage said plates, a source of fluid under pressure, said manual applying means including control valve means operable to connect said source to said cylinder to supply fluid to said cylinder having a pressure proportional to the mechanical applying force transmitted by said manual applying means.

6. In a control system for a friction engaging device, a first member, a second member, a plurality of friction elements with a first of said elements connected to the first member and a second of said elements connected to said second member, said second element being movable in an engaging direction to engage said first element for engagement of said first and second elements, a fluid motor having a fluid chamber and a movable wall mounted for movement in said engaging direction to contact said second element and for movement in another direction and including cam means responsive to said movement in another direction of said movable wall to move said movable wall in said engaging direction into engagement with said second element, manual applying mechanical linkage means connected to said movable wall to apply a manual applying force to move said movable wall first in said another direction to actuate said cam means to move said movable wall in said engaging direction to engage said first and second elements, a source of fluid under pressure, said manual applying mechanical linkage means including control valve means operable to connect said source to said fluid chamber to supply fluid to said fluid chamber having a pressure proportional to the manual applying force transmitted by said manual applying means.

7. In a control system for a friction engaging device, a first member, a second member, a plurality of friction elements with a first of said elements connected to the first member and a second of said elements connected to said second member, said second element being movable in an engaging direction to engage said first element for engagement of said first and second elements, a cylinder and a piston mounted in said cylinder for movement in said engaging direction to contact said second element and for movement in another direction and including cam means responsive to said movement in another direction of said piston relative to said cylinder to move said piston in said engaging direction into engagement with said second element, manual applying means connected to said piston to apply a manual force directly to said piston to move said piston in said another direction to actuate said cam means to engage said elements, a source of fluid under pressure, said manual applying means including control valve means inoperative when said manual force is below a predetermined low brake applying value and operable only when said manual force is above a predetermined low brake applying value to connect said source to said cylinder to supply fluid to said cylinder having a pressure proportional to the increase of the manual force transmitted by said manual applying means above said predetermined value.

8. In a control system for a friction engaging device, a first member, a second member, a plurality of friction element swith a first of said elements connected to the first member and a second of said elements connected to said second member, said second element being movable in an engaging direction to engage said first element for engagement of said first and second elements, a cylinder and a piston mounted in said cylinder for movement in said engaging direction to contact said second element and for movement in another direction and including cam means responsive to said movement in another direction of said piston relative to said cylinder to move said piston in said engaging direction into engagement with said second element, said cylinder having exhaust means to continuously exhaust fluid from said cylinder, manual applying means connected to said piston to apply a manual force to first move said piston in said another direction to actuate said cam means to move said piston in said engaging direction to engage said elements, a source of fluid under pressure, said manual applying means including control valve means for transmitting said manual force and operable to connect said source to said cylinder and to control the rate of supply of fluid to said cylinder to provide a pressure in said cylinder proportional to the mechanical applying manual force transmitted by said manual applying means.

9. In a control system for a friction engaging device, a first member, a second member, a plurality of friction elements with a first of said elements connected to the first member and a second of said elements connected to said second member, said second element being movable in an engaging direction to engage said first element for engagement of said first and second elements, a cylinder and a piston mounted in said cylinder for movement in said engaging direction to contact said second element and for movement in another direction and including cam means responsive to said movement in another direction of said piston relative to said cylinder to move said piston in said engaging direction into engagement with said second element, manual applying means connected to said piston to apply a manual force to first move said piston in said another direction to actuate said cam means to move said piston in said engaging direction to engage said first and second elements, a source of fluid under pressure said manual applying means including control valve means operable to transmit said manual force and to connect said source to said cylinder to supply fluid to said cylinder having a pressure proportional to the mechanical applying force transmitted by said manual applying means.

10. In a control system for a friction engaging device, a first member, a second member, a plurality of friction elements with a first of said elements connected to the first member and a second of said elements connected to said second member, said second element being movable in an engaging direction to engage said first element for engagement of said first and second elements, a fluid motor having a fluid chamber and a movable wall mounted for movement in said engaging direction to contact said second element and for movement in another direction and including cam means responsive to said movement in another direction of said movable wall to move said movable wall in said engaging direction into engagement with said second element, manual applying means connected to said movable wall to apply a manual force to move said movable wall in said another direction to actuate said cam means to engage said elements, a source of fluid under pressure, said manual applying means including control valve means connected as a manual force transmitting part of said mechanical applying means and having two valve parts and biasing means biasing the two valve parts to a closed position and transmitting said manual force from one to another of said parts and moved to an open position against said biasing means by said manual force for operation to connect said source to said fluid chamber to supply fluid to said fluid chamber having a pressure proportional to the manual applying force transmitted by said manual applying means.

11. In a control system for a friction engaging device, a first member, a second member, a plurality of friction elements with a first of said elements connected to the first member and a second of said elements connected to said second member, said second element being movable in an engaging direction to engage said first element, a fluid motor having a fluid chamber and a movable wall mounted for movement in said engaging direction to contact said second element and for movement in another direction and including cam means responsive to said movement in another direction of said movable wall to move said movable wall in said engaging direction into engagement with said second element for engagement of said first and second elements, a manual applying mechanical linkage connected to said movable wall to apply a manual force to move said movable wall in said another direction to actuate said cam means to engage said elements, a source of fluid under pressure, said manual applying mechanical linkage including control valve means connected as a manual force transmitting part of said manual applying mechanical linkage and having two valve parts and biasing means for transmitting said manual force and biasing said valve parts to a closed position and moved to an open position by said manual force overcoming said biasing means for operation to connect said source to said fluid chamber to supply fluid to said fluid chamber at a rate of flow proportional to the manual applying force transmitted by said manual applying means and means to continuously vent said fluid chamber to provide a pressure in said fluid chamber proportional to said rate of flow and said manual applying force.

12. In a control system for a friction engaging device, a first member, a second member, a plurality of friction elements with a first of said elements connected to the first member and a second of said elements connected to said second member, said second element being movable in an engaging direction to engage said first element, a cylinder and a piston mounted in said cylinder for movement in said engaging direction to contact said second element for engaging said first and second elements and for movement in another direction and including cam means responsive to said movement in another direction of said piston relative to said cylinder to move said piston in said engaging direction into engagement with said second element, manual applying means connected to said piston to apply a manual force to move said piston in said another direction to actuate said cam means to engage said elements, a source of fluid under pressure, said manual applying means including control valve means connected as a manual force transmitting part of said mechanical applying means and having two valve parts and biasing means biasing said two valve parts to a closed position when transmitting a predetermined low manual force to provide low force application and moved to an open position by said manual force when above said predetermined low force application for operation to connect said source to said cylinder to supply fluid to said cylinder having a pressure proportional to the manual applying force transmitted by said manual applying means.

13. In a control system for a friction engaging device, a first member, a second member, a plurality of friction elements with a first of said friction elements connected to the first member and a second of said friction elements connected to said second member, said second friction element being movable in an engaging direction to engage said first friction element, engaging means including a fluid motor having a fluid chamber and a movable wall mounted for movement in said engaging direction to contact said second friction element for engagement of said first and second friction elements and for movement in another direction and including cam means responsive to said movement in another direction of said movable wall to move said movable wall in said engaging direction into engagement with said second friction element, a source of fluid under pressure, a manually operated member movable in an apply direction to apply a manual force to said engaging means, a valve including one valve element connected to said manually operated member and another valve element connected to said movable wall, movement of said manually operated member in said apply direction moving said valve elements relative to each other in one direction and bodily shifting said valve elements and moving said movable wall in said another direction, biasing means operative to transmit said manual force from one valve element to the other valve element and to move said valve elements in another direction, said valve elements on movement in said one direction moving to the open position connecting said source to said biasing means to increase said biasing force proportional to said manual force and to control the rate of supply of fluid to said fluid chamber proportional to said manual force to apply said friction elements and said valve elements on movement in said another direction blocking said source from said biasing means and said cylinder, and means to continuously exhaust the supply to said fluid chamber to provide a pressure in said fluid chamber proportional to said rate of supply of fluid.

14. In a control system for a friction engaging device, a first member, a second member, a plurality of friction elements with a first of said friction elements connected to the first member and a second of said friction elements connected to said second member, said second friction elements being movable in an engaging direction to engage said first friction element, engaging means including a fluid motor having a fluid chamber and a movable wall mounted for movement in said engaging direction to contact said second friction element for engaging said first and second friction elements and for movement in another direction and including cam means responsive to said movement in another direction of said movable wall to move said movable wall in said engaging direction into engagement with said second friction element, a source of fluid under pressure, a manually operated member movable in an apply direction to apply a manual force to said engaging means, a valve including one valve element connected to said manually operated member and another valve element connected to said movable wall, movement of said manually operated member in said apply direction moving said valve elements relative to each other in one direction and bodily shifting said valve and moving said movable wall in said another direction, biasing means operative to transmit said manual force from one valve element to the other valve element and to relatively move said valve elements in another direction, said valve elements on movement in said one direction moving to the open position connecting said source to said biasing means to increase said biasing force proportional to said manual force and to supply fluid to said fluid chamber at a pressure proportional to said manual force to apply said friction elements, and said valve elements on movement in said another direction blocking said source from said biasing means and said cylinder.

15. In a brake, a fixed member, a rotary member, a fixed element connected to said fixed member and a rotary element connected to said rotary member, one of said elements being movable in an engaging direction to engage the other of said elements, a fluid motor having an operating chamber and a movable wall mouted for movement in said engaging direction to contact said rotary element and for movement in another direction and including cam means responsive to said movement in another direction of said movable wall to move said movable wall in said engaging direction into engagement with said rotary element, manual applying means connected to said movable wall to apply a manual force to move said movable wall in said another direction to actuate said cam means to engage said elements, a source of fluid under pressure, said manual applying means including control valve means connected as a manual force transmitting part of said mechanical applying means and having two valve parts and biasing means transmitting said manual force from one valve part to the other and biasing said valve parts to a closed position and moved to an open position by said manual force for operation to transmit force and to connect said source to said fluid chamber to supply fluid to said fluid chamber having a pressure varying with the manual applying force transmitted by said manual applying means.

16. In a brake, a fixed friction element and a rotary friction element, said rotary friction element being movable in an engaging direction to engage said fixed friction element, a cylinder and a piston mounted in said cylinder for movement in said engaging direction to contact said rotary friction element and for movement in another direction and including cam means responsive to said movement in another direction of said piston relative to said cylinder to move said piston in said engaging direction into engagement with said rotary friction element, a source of fluid under pressure, a manually operated member to apply a manual force to said device, a valve including one valve element connected to and moving with said manually operated member and another valve element connected to and moving with said piston, movement of said manually operated member moving said valve elements relative to each other in one direction, biasing means operative to transmit said manual force from one valve element to the other and to move said valve elements relative to each other in another direction, said valve elements on movement in said one direction moving to the open position connecting said source to said biasing means to increase said biasing force proportional to said manual force and to supply fluid to said cylinder to apply said friction elements and said valve elements on movement in said another direction blocking said source from said biasing means and said cylinder.

17. In a control mechanism, manual control means manually moved in a direction to provide an actuating force, a mechanically and fluid actuated movable device movable in a direction, a control valve assembly having a first valve element operably connected to said manual control means, a second valve element operably connected to said movable device, a source of fluid under pressure, biasing means connected between said valve elements biasing said valve elements to a closed position blocking flow from said source and transmitting said mechanical actuating force from said manual control means to move said movable device from one valve element to the other valve element, said valve elements being responsive to movement of said manual control means in said direction to move said valve elements against said biasing force to an open position connecting said source to said device, said valve elements having an unbalanced area responsive to the pressure of the fluid supplied to said device to control the supply of fluid to said device to provide a pressure proportional to said mechanical actuating force.

18. The invention defined in claim 17 and means to preload said biasing means to allow said manual means to transmit a predetermined mechanical actuating force before opening said control valve assembly.

References Cited in the file of this patent

UNITED STATES PATENTS

| | | |
|---|---|---|
| 2,799,366 | Zindler | July 16, 1957 |
| 2,838,139 | Des Rosiers | June 10, 1958 |
| 2,914,142 | Klaue | Nov. 24, 1959 |
| 2,938,608 | Kersher | May 31, 1960 |
| 2,971,612 | Graber | Feb. 14, 1961 |

FOREIGN PATENTS

| | | |
|---|---|---|
| 1,120,376 | France | Apr. 16, 1956 |

UNITED STATES PATENT OFFICE
CERTIFICATE OF CORRECTION

Patent No. 3,106,268                                   October 8, 1963

Howard W. Christenson et al.

It is hereby certified that error appears in the above numbered patent requiring correction and that the said Letters Patent should read as corrected below.

Column 5, line 13, for "of", second occurrence, read -- to --; line 25, for "maual" read -- manual --; same column 5, line 72, for "position" read -- piston --; column 9, lines 14 and 15, for "elements" read -- element --.

Signed and sealed this 21st day of April 1964.

(SEAL)
Attest:
ERNEST W. SWIDER

Attesting Officer

EDWARD J. BRENNER

Commissioner of Patents